United States Patent
Mahadevan et al.

(10) Patent No.: US 8,510,578 B2
(45) Date of Patent: Aug. 13, 2013

(54) LINE-CARD DISABLING FOR POWER MANAGEMENT

(75) Inventors: Priya Mahadevan, Sunnyvale, CA (US); Puneet Sharma, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 12/431,628

(22) Filed: Apr. 28, 2009

(65) Prior Publication Data

US 2010/0274943 A1    Oct. 28, 2010

(51) Int. Cl.
- *G06F 1/32* (2006.01)
- *G06F 1/00* (2006.01)
- *H05K 7/10* (2006.01)

(52) U.S. Cl.
USPC ............................ 713/320; 713/300; 710/301

(58) Field of Classification Search
USPC .......................................................... 713/300
See application file for complete search history.

(56) References Cited

U.S. PATENT DOCUMENTS

| | | | | |
|---|---|---|---|---|
| 5,067,149 A | * | 11/1991 | Schneid et al. | 379/265.03 |
| 5,267,305 A | * | 11/1993 | Prohs et al. | 379/233 |
| 5,859,895 A | * | 1/1999 | Pomp et al. | 379/9.05 |
| 7,801,040 B1 | * | 9/2010 | Singh et al. | 370/230.1 |
| 7,881,188 B2 | * | 2/2011 | Li et al. | 370/217 |

OTHER PUBLICATIONS

Nedevschi, S. et al., "Reducing Network Energy Consumption via Sleeping and Rate-Adaption", USENIX, NSDI'08, 2008.
Gupta, M. et al., "A Feasability Study for Power Management in LAN Switches", Proc. of the 12th ICNP'04, Oct. 2004.
Gupta, M. et al., "Using Low-power Modes for Energy Conservation in Ethernet LANs", IEEE INFOCOM, May 2007.

* cited by examiner

*Primary Examiner* — Suresh Suryawanshi

(57) ABSTRACT

A power management apparatus is configured to manage a switch having line-cards with ports. The management apparatus includes a tracking module configured to track activity for each port in a line-card in the switch, and a control module configured to determine whether the line-card is to be disabled. The management apparatus also includes output module configured to initiate a deactivation process for the line-card if all the ports are inactive.

23 Claims, 5 Drawing Sheets

LINE-CARD DISABLING FOR POWER MANAGEMENT

RELATED APPLICATIONS

The present application is related to U.S. patent application Ser. No. 12/817,907, entitled "SYSTEM FOR CONTROLLING POWER CONSUMPTION OF A NETWORK", by Puneet Sharma et al.", which is incorporated by reference in its entirety.

BACKGROUND

A network node may be located in a data center, as well as in other networks such as an enterprise network, a campus network, etc. In communicating data, a network node is generally not power-proportional in that power consumed by the network node is not proportional to the amount of data transferred by the network node. For instance, a switch that has an active port may consume almost the same amount of power in keeping the port on regardless of how much data that the switch transfers.

Furthermore, switches waste power even if a port is not being used to communicate data. In many current switch models once a line-card is inserted into one of the plurality of slots located on the switch, the line-card immediately draws power. If the line-card has active or enabled ports, the ports also draw power. Even though all of the ports on the line-card are not enabled and may not have any cables hanging out of them, power is still consumed by the line-card. In conventional data centers, there may be many switches that have unused line-cards. These line-cards may have no cables plugged into the ports, or all the ports on the line-card may be explicitly disabled.

In many current switch models when all ports on a line-card are turned off, the power to the line-card is not automatically turned off, leading each unused line-card to consume upwards of 35 Watts. In a data center comprising a large number of switches this unnecessary power consumption results in wasted operational expenditure.

BRIEF DESCRIPTION OF DRAWINGS

The embodiments of the invention will be described in detail in the following description with reference to the following figures.

DETAILED DESCRIPTION OF EMBODIMENTS

Figure 1:
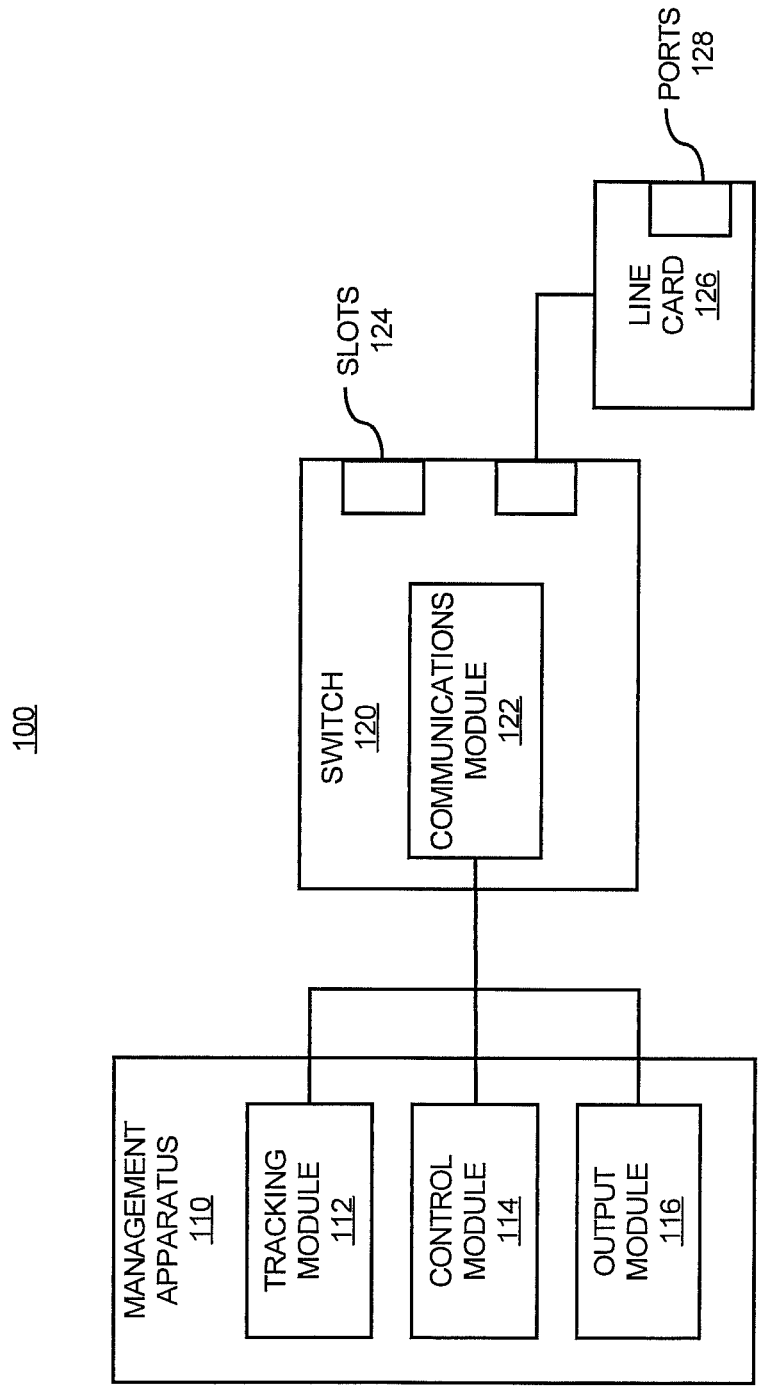
FIG. 1 illustrates a functional block diagram of a management system according to an embodiment of the invention.

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the description of the embodiments.

As referred to in this disclosure, a network node may be any reasonably suitable node in a network that receives and transfers data to another node or a network device such as a switch, router, repeater, hubs, etc.

As referred to in this disclosure, a switch is a network device that receives and sends data to another network device such as a switch, router, repeater, hub, etc.

A switch may comprise a base chassis with a plurality of slots, wherein line-cards may be inserted as required. For instance, the switch may have between 4 and 9 slots for inserting line-cards as is known for switches deployed in data centers, as well as network edges and cores. The line-card may have a number of ports and port capacities. For instance, in an HP ProCurve 5406zl switch, a line-card may have 24 ports, each port supporting 1 Gbps in the full-duplex mode, and/or a line-card may have 4 ports, each port supporting 10 Gbps.

As referred to in this disclosure, a port is a specific point on a switch that allows physical connection to some other device such as another switch, router, repeater, hub, etc. Network data is received and transmitted by a port. Ports are usually located on a line-card. Examples of ports include an Ethernet port, a SCSI (small computer system interface) port, and other physical ports.

As referred to in this disclosure, a configuration of a switch may be any reasonably suitable configuration for operating a switch. The configuration may comprise different combinations of activated line-cards and active ports.

As referred to in this disclosure, a port is active if it is currently sending or receiving data or has sent or received data within a predetermined time.

As referred to in this disclosure, a line-card is enabled if it is plugged in and consuming power. A line-card is disabled if it is rendered inoperable to send or receive data for the switch. Also, when disabled the line-card consumes significantly less power than when enabled, for instance at least 80% less power than when enabled. Also, deactivate and disable are used interchangeably herein.

According to an embodiment, a management apparatus is configured to manage a switch having a plurality of slots. A line-card, having at least one port, is plugged into one of the plurality of slots. The management apparatus comprises a tracking module configured to track non-activity for the line-card, a control module configured to determine whether a particular line-card on the switch is to be deactivated and an output module to execute the deactivation process for the line-card when all ports are made inactive by a configuration change of the switch. By deactivating inactive line-cards, the management apparatus manages power consumption and therefore may also be described as a power management apparatus.

As described above, in many current switch models when all ports on a line-card are turned off, the power to the line-card is not automatically turned off, leading each unused line-card to consume upwards of 35 Watts. This is wasted power. According to an embodiment, by deactivating the line-card and thereby automatically turning off the power to the line-card, the management apparatus may save substantial power (for each line-card with all its ports disabled). Turning off power to each line-card that is not in use does not impede the switch's functionality as none of the ports on the disabled line-card were being used.

By deactivating a line-card when all ports on the line-card are made inactive as a result of a configuration change of the switch, the management apparatus decreases overall power consumption in routing network data, the network may yield a considerable energy saving with substantially no performance deterioration.

Turning now to FIG. 1, shown therein is a functional block diagram of a management system 100, according to an embodiment of the invention. It should be understood that the management system 100 shown in FIG. 1 and other systems shown in the other figures herein may include additional components and that some of the components described herein may be removed and/or modified without departing from a scope of the management systems. For example, the management system 100 may manage more switches than the one shown in FIG. 1.

As depicted in FIG. 1, the management system 100 is comprised of a management apparatus 110 and a switch 120. The management apparatus 110 is comprised of a tracking module 112, a control module 114 and an output module 116. The switch 120 may have a communication module 122 through which it may communicate with the management apparatus 110. The switch 120 also has a plurality of slots 124 that may each have a line-card 126 plugged therein. The line-card 126 has ports 128, that may comprise a single port.

The switch 120 may be any network switch that has a mechanism that enables the management apparatus 110 to power off the line-card 126. For instance, the switch 120 may utilize command lines certified to enable or disable the line-card 126. Alternately, the switch 120 may communicate with the management apparatus 110 through the communication module 122 using a simple network management protocol (SNMP) to send a command to enable or disable the line-card 126. The switch 120 may also communicate with the management apparatus 110 through a web interface.

The line-card 126 may be any currently available line-card compatible with the switch 120. The ports 128 on the line-card 126 may comprise a plurality of communications ports.

The management apparatus 110 is configured to direct the operation of the switch 120 in order to automatically disable the line-card 124 if a configuration change of the switch makes all of the ports 128 inactive. The tracking module 112 notes the activity status for every port on each of the line-cards 126. When the configuration change makes all of the ports 128 inactive, the control module 114 directs the output module 106 to disable the line-card 126.

Some examples of configuration changes that makes all the ports inactive include disconnecting any devices from all of the ports 128 in the line-card 126. In this situation, the line card 126 is consuming power when plugged-in. If no devices are connected to any of the ports, then the line-card 126 is disabled to consume significantly less power. In another example, the configuration change includes if the line-card 126 is plugged in but none of the ports are connected to a device. In yet another example, the configuration change occurs when the tracking module 112 measures a period of inactivity for all the ports 128 on the line-card 126. The line-card is determined to be inactive by the control module 114 if all the ports remain inactive for a predetermined time. Then, the line-card 126 is disabled.

The management apparatus 110 may communicate with the switch 120 by a wireless transmission. Alternately, the management apparatus 110 may communicate with the switch 120 through a wired transmission. Also, the management apparatus 110 may manage a plurality of switches. The switch 120 receives instructions from the management apparatus 110 through the communication module 122 to enable or disable the line-card 126.

According to an embodiment, the tracking module 112, at the time of booting of the switch 120, checks if there is a line-card in the switch 120 that has all inactive ports. The tracking module 112 also notifies the control module 114 every time a port is deactivated. Further, the tracking module 112 notifies the control module 114 every time the configuration of the switch 110 is changed. The configuration change may be if a port becomes active or inactive.

If any of the changes result in all of the ports of a line-card being inactive, the management apparatus 110 is configured to deactivate that line-card, such as the line-card 126 if all the ports 128 are inactive. The control module 114 directs the output module 106 to disable the line-card 126 if all of the ports 128 are inactive in order to save power. Similarly, if any of the ports 128 on the line-card 126 becomes active, the line-card 126 is enabled (i.e., powered on) as directed by the control module 114.

Figure 2:
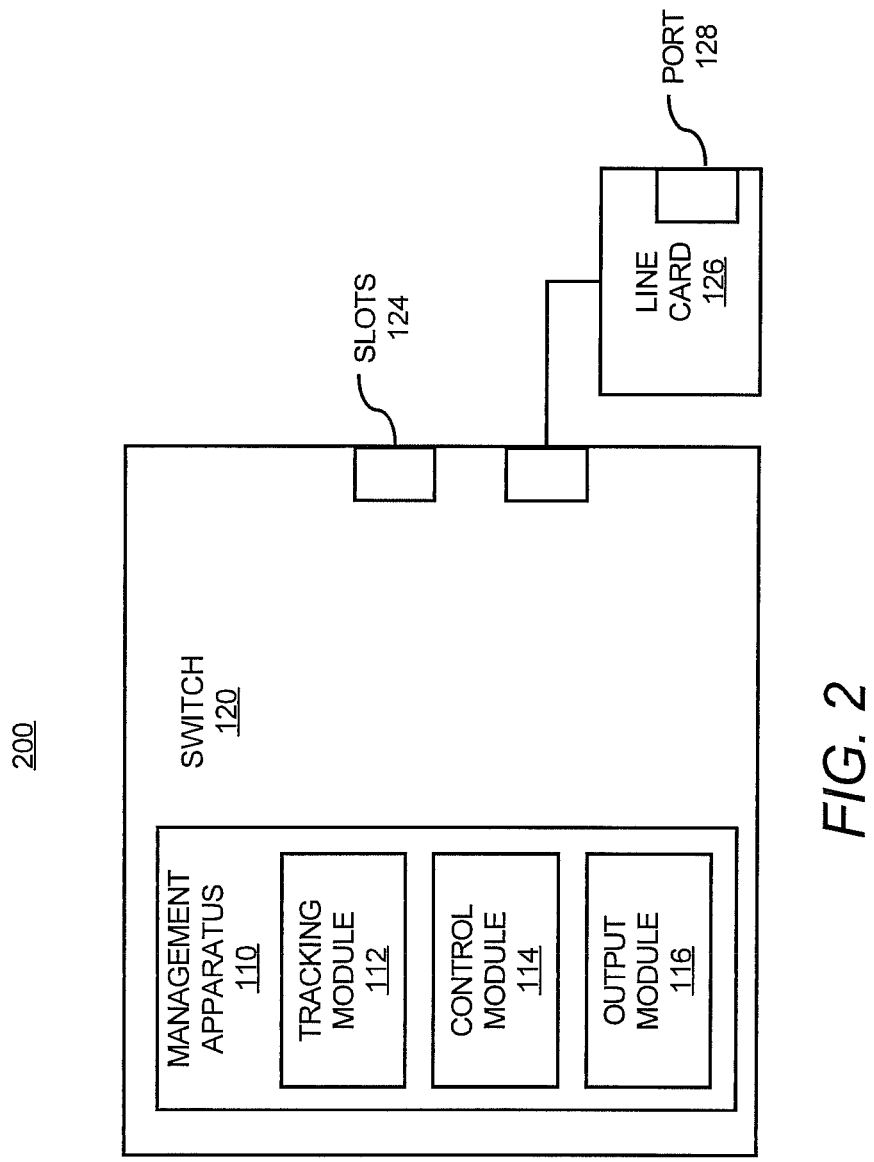
FIG. 2 illustrates a functional block diagram of a management system according to another embodiment of the invention.

Turning now to FIG. 2, shown therein is a functional block diagram of a management system 200, according to an embodiment of the invention.

In this embodiment, the management apparatus 110 is in the switch 120. As depicted in FIG. 2, the management system 200 is comprised of the management apparatus 110 and the switch 120. The management apparatus 110 is an integral part of the switch 120. The management apparatus 110 is comprised of the tracking module 112, the control module 114 and the output module 116 as described with respect to FIG. 1. The switch 120 also has a plurality of slots 124 that may have line-card 126 plugged in. The line-card 126 has ports 128, also as described with respect to FIG. 1. The management apparatus 110 in the switch 120 may manage other switches within the data center.

According to an embodiment, the management apparatus 110 is a computer program that runs on the switch 120. The management apparatus 110 automatically starts up when the switch 120 boots up. The management apparatus 110 monitors each line-card 126 and keeps track of how many of the ports 128 are active on each line-card 126. If all of the ports 128 are inactive, the management apparatus 110 invokes a command to power-off the line-card 126. The command is currently available on many switches.

Figure 3:
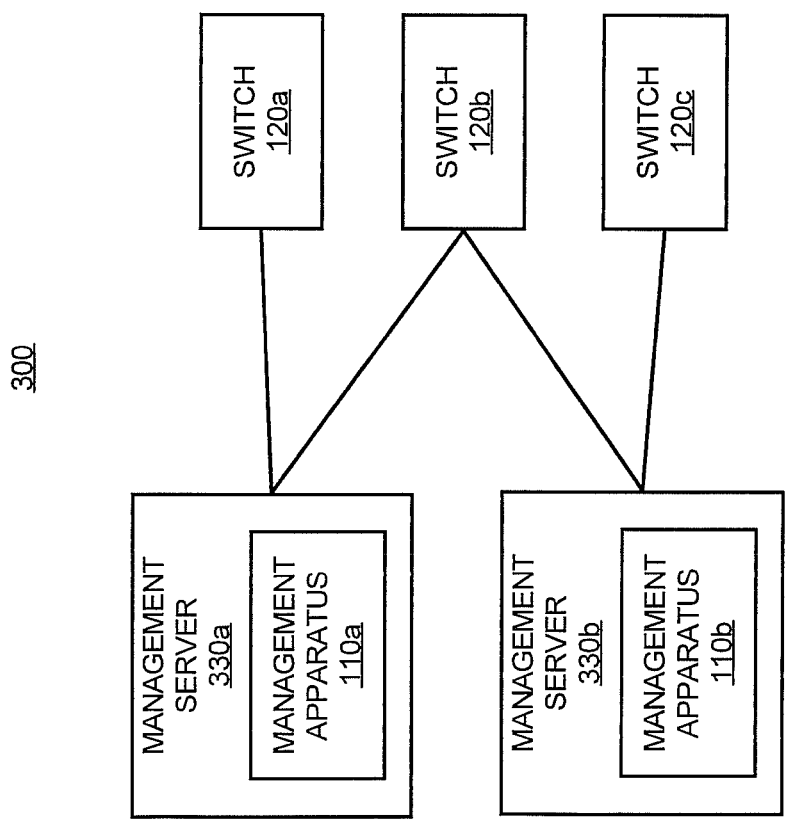
FIG. 3 illustrates a functional block diagram of a management system according to another embodiment of the invention.

Turning now to FIG. 3, shown therein is a functional block diagram of a management system 300, according to an embodiment of the invention.

In this embodiment, management servers 330 are operable to manage multiple switches to enable and disable line-cards for power savings. As depicted in FIG. 3, the management system 300 is comprised of a plurality of management servers 330. Each of the management servers 330a-b hosts a management apparatus 110a-b. Each management apparatus 110 is comprised of the tracking module 112, the control module 114 and the output module 116 as described with respect to FIG. 1. The management servers 330a-b manage switches 120a-c.

According to an embodiment, each of the management servers 330a-b may manage multiple switches. For instance, management server 330a manages switches 120a-b. Also, each switch may be managed by multiple management servers. For instance, switches 120a is managed by both management server 330a and management server 330b. Redundancy of the components of the data center serves to protect against failure of particular components.

Figure 4:
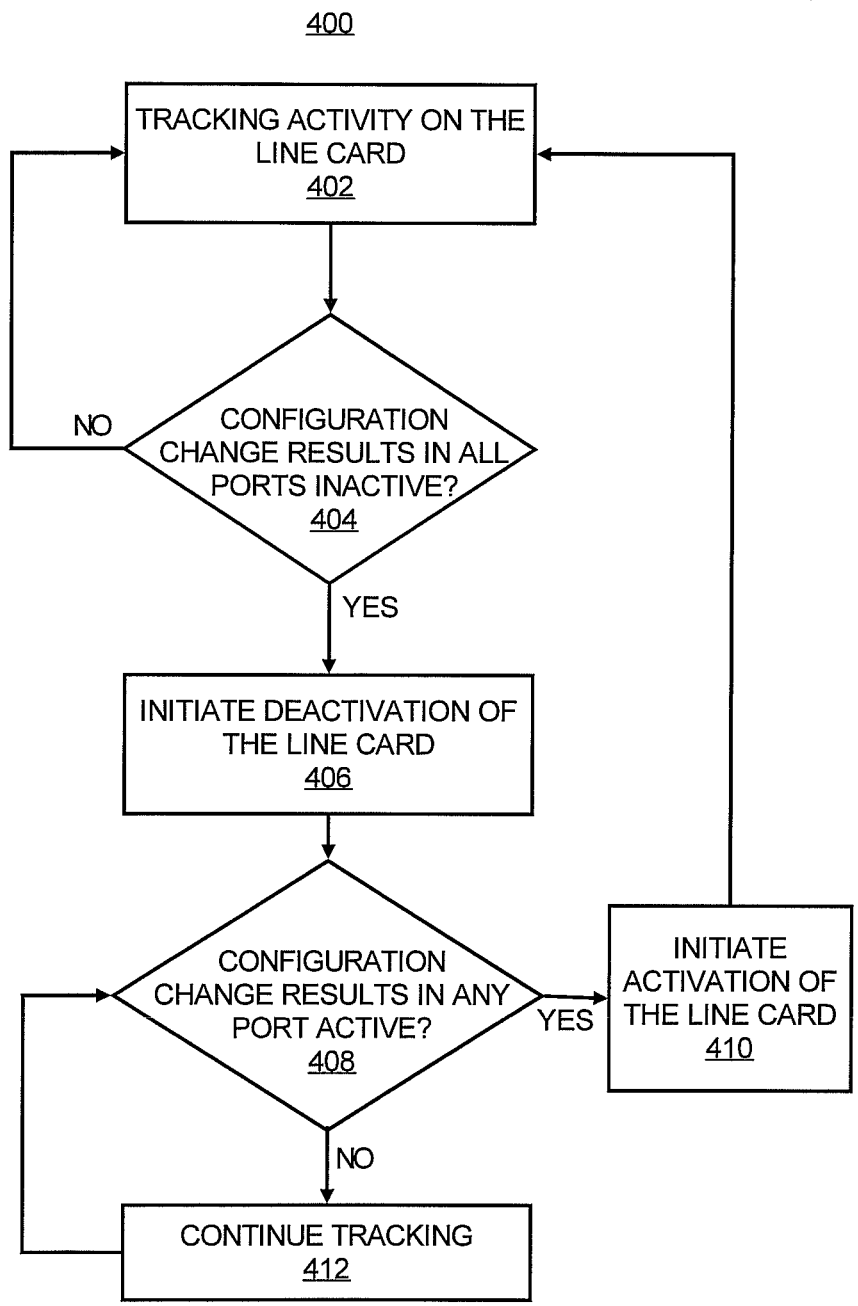
FIG. 4 illustrates a method performed by at least one or more computer readable data storage mediums for controlling power consumption of a switch according to an embodiment of the invention.

Turning now to FIG. 4, there is shown a flow diagram of a method 400 of implementing the management systems 100, 200 and 300 depicted in FIGS. 1-3, according to an embodiment. It should be understood that the method 400 depicted in FIG. 4 may include additional steps and that some of the steps described herein may be removed and/or modified without departing from a scope of the method 400.

At step 402, the tracking module 112 tracks activity on each line-card 126. The tracking module 112 notes the activity status for every port on each of the line-cards 126. For example, the tracking module 112 notes the change in activity status of all the ports 128 on the line-card 126 for each configuration change of the switch and reports the change to the control module 114. If a device is disconnected from a port or no activity is detected on a port for a predetermined time, the configuration changes are reported. Also, configuration changes, such as connecting a device to a port or new activity on a port, such as receipt of a packet, after a time out is also reported.

At step 404, the control module 114 receives a report and determines if all the ports 128 on the line-card 126 are inactive, for example, as a result of one or more configuration changes.

The control module 114 then directs the output module 116 to initiate the deactivation process if all the ports are inactive. A result of a configuration change that initiates the deactivation process may include a line-card that is plugged-in but no devices are connected to any of the ports or if there is no activity on any of the ports for a predetermined time.

At step 406, the output module 116 initiates deactivation of the line-card. The output module 116 may communicate with the switch 120 through the communication module 122 using a simple network management protocol (SNMP). The switch 120 may thereafter complete the deactivation process for the line-card 126. Alternately, the output module 116 may deactivate the switch 120 with command lines that may be certified on the switch 120 to power off particular of the line-card 126. The output module 116 may complete the deactivation process.

At step 408, the tracking module 112 tracks activity on each line-card 126 and determines whether any of the ports 128 on the line-card 126 become active after the line-card 126 was disabled at step 408. For example, a configuration change is detected that indicates a device has been plugged into a port or there is new activity on a port.

At step 410, if the tracking module 112 detects activity for any of the ports 128 on the line-card 128 that has been disabled, the management apparatus 110 initiates activation of the line-card 126. For instance, if the tracking module 112 has received packets assigning a data flow to any of the ports 128, the control module 114 directs the output module 116 to initiate activation of the line-card 126. The output module 116 initiates activation of the line-card 126. The output module 116 may complete the activation process for the line-card 126. Alternately, the output module may initiate the activation process and the switch may complete the activation process, similarly to the deactivation process described in step 406 above. The line-card 126 is thereafter enabled. Alternately, at step 412, If the tracking module 112 does not receive packets assigning a data flow to any of the ports 128, the tracking module 112 continues tracking the activity on the ports 128 of the line-card 126.

Figure 5:
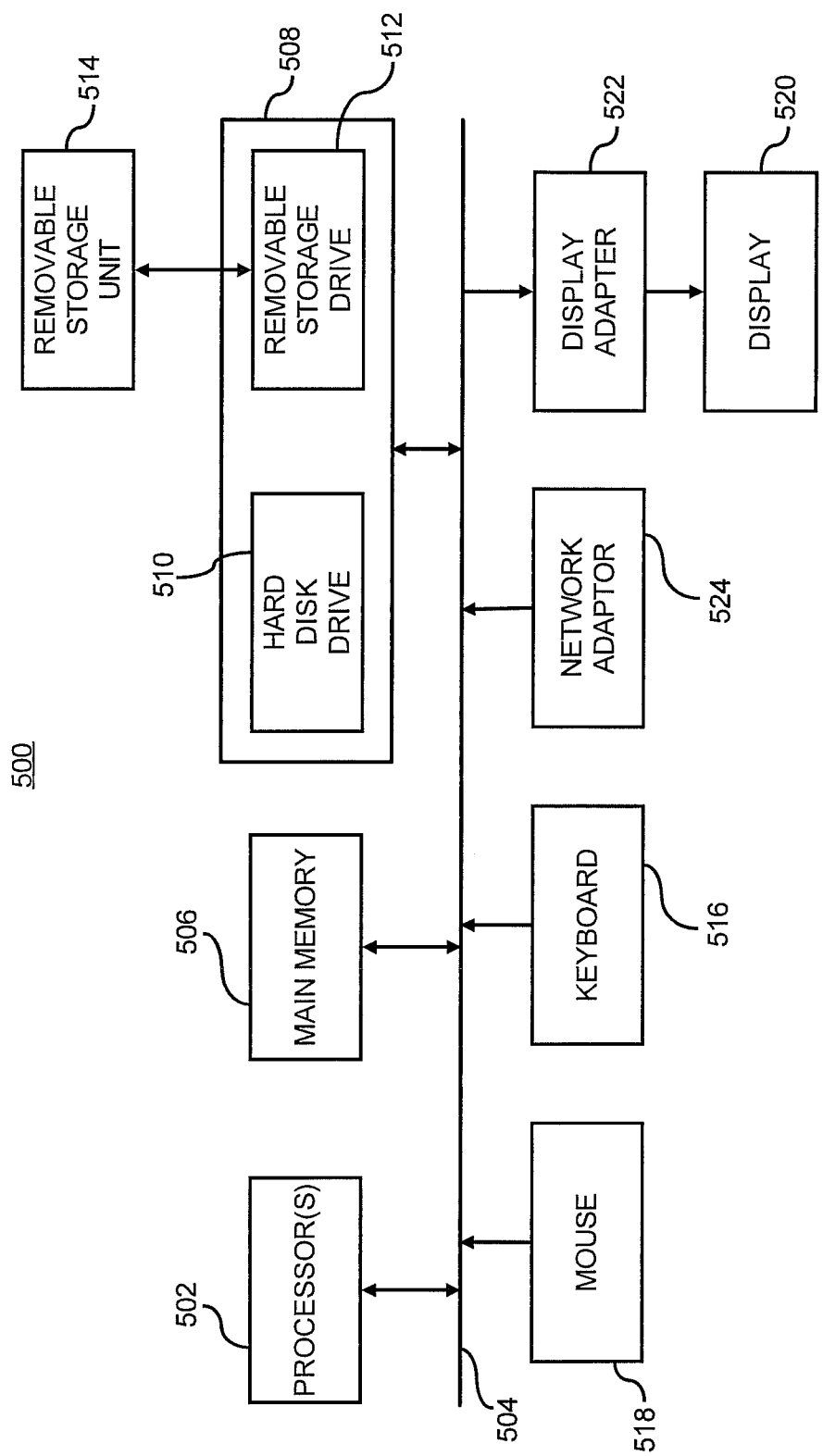
FIG. 5 illustrates a block diagram of a computing apparatus configured to implement or execute any one or more modules, applications or programs according to an embodiment of the invention.

Turning now to FIG. 5, there is shown a block diagram of a computing apparatus 500 that may be configured to implement or execute any one or more modules, applications or programs of the management system 100, the management system 200, the management system 300, and the method 400 depicted in FIGS. 1-4 according to an embodiment of the invention. In this respect, the computing apparatus 500 may be used as a platform for executing any one or more functions described above with respect to any one or more modules, applications or programs of the management system 100, the management system 200, the management system 300, and the method 400. The computing apparatus 500 may be incorporated into the management server 330. Alternately, components of the apparatus 500 may be used to implement the management apparatus 110.

The computing apparatus 500 includes a processor 502 that may implement or execute functions of one or more steps described in the method 400 and functions of the management system 100, the management system 200, and the management system 300. Commands and data from the processor 402 are communicated over a communication bus 504. The computing apparatus 500 also includes a main memory 506, such as a random access memory (RAM), where the program code for the processor 502, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the management system 100, the management system 200, the management system 300 and/or the method 400 may be stored.

The removable storage drive 512 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor(s) 502 may communicate over a network, for instance, the Internet, LAN, etc., through a network adaptor 524.

It will be apparent to one of ordinary skill in the art that other known electronic components may be added or substituted in the computing apparatus 500. It should also be apparent that one or more of the components depicted in FIG. 5 may be optional (for instance, user input devices, secondary memory, etc.).

Any one or more of the above-described operations of the management system 100, the management system 200, the management system 300 and the method 400 in FIGS. 1-4 may be contained as a computer program product embodied on one or more tangible computer readable storage mediums. The computer program product may exist in a variety of forms both active and inactive. For instance, the computer program product may exist as software program(s) comprised of program instructions in source code, object code, executable code or other formats whether compressed or uncompressed. Exemplary tangible computer readable storage mediums include conventional computer system RAM, ROM, EPROM, EEPROM, and magnetic or optical disks or tapes.

While exemplary features and embodiments of FIGS. 1-4 have been explained within the context of each feature and embodiment, any one or all of the exemplary features and embodiments of the invention may be applied and is incorporated in any and all of the embodiments of the invention unless clearly contradictory.

While the embodiments have been described with reference to examples, those skilled in the art will be able to make various modifications to the described embodiments without departing from the scope of the claimed embodiments.

What is claimed is:

1. A power management apparatus to manage a switch having a plurality of slots wherein line-cards are operable to be plugged into the plurality of slots, each line-card having at least one port, wherein the management apparatus includes a computer system comprising:
   a tracking module to track activity for each port in a line-card plugged into a slot in the switch;
   a control module to determine whether all the ports in the line-card are inactive; and
   an output module to automatically initiate a deactivation process for the line-card when all the ports in the line-card are inactive.

2. The management apparatus of claim 1, wherein the management apparatus forms part of the switch.

3. The management apparatus of claim 1, wherein the tracking module is to continuously monitor the line card to detect activity on any of the ports.

4. The management apparatus of claim 1, wherein the control module is to determine whether the line-card is to be deactivated at a time of a configuration change of the switch.

5. The management apparatus of claim 4, wherein the configuration change comprises disconnecting a device from one or more of the ports.

6. The management apparatus of claim 1, wherein the control module is to determine whether the line-card is to be deactivated at a time of booting of the switch.

7. The management apparatus of claim 1, wherein the output module is to continuously monitor the line card to detect activity on any of the ports.

8. The management apparatus of claim 1, wherein the at least one line card consumes power when plugged into the switch regardless of whether there is activity in the at least one port.

9. The management apparatus of claim 1, wherein the management apparatus is to initiate an activation process for the line-card when a port on the line-card becomes active.

10. The management apparatus of claim 1, wherein the control module is to directly control the deactivation process on the switch.

11. The management apparatus of claim 1, wherein the control module is to communicate instruction signals to the switch to perform the deactivation process on the line-card.

12. The management apparatus of claim 1, wherein the management apparatus is to manage a plurality of switches.

13. The management apparatus of claim 1, wherein the deactivation process is to minimize power consumed by the switch.

14. A method of managing power consumption of a switch, the method comprising:
   tracking activity of all ports on a line-card;
   determining whether all the ports on the line-card are inactive; and
   automatically initiating, with a processor, deactivation of the line-card when all the ports in the line-card are inactive.

15. The method of claim 14, wherein tracking activity of all ports on the linecard further comprises
   detecting a configuration change including a device being disconnected from a port on the line-card.

16. The method of claim 14, wherein tracking activity of all ports on the linecard further comprises
   detecting a configuration change including inactivity on one or more of the ports for a predetermined time.

17. The method of claim 14 further comprising:
   tracking activity of all the ports on the line-card after deactivation of the line-card;
   determining whether a configuration change results in activity on at least one of the ports; and
   initiating activation of the line-card if the configuration change results in the activity on the at least one of the ports.

18. A network switch comprising:
   a plurality of slots structured to respectively receive line-cards;
   a tracking module to track non-activity of ports in a line-card plugged into a slot in the switch;
   a control module to determine whether the line-card is to be deactivated based on whether all the ports are inactive; and
   an output module to automatically initiate a deactivation process for the line-card when all the ports in the line-card are inactive.

19. The network switch of claim 18, wherein the output module is to continuously monitor the line card to detect activity on any of the ports.

20. The network switch of claim 18, wherein the management apparatus is to manage a plurality of switches.

21. The management apparatus of claim 1, wherein the deactivation process deactivates the line-card, and the line-card consumes at least 80% less power when deactivated as compared to when the line-card is activated.

22. The method of claim 14, wherein initiating deactivation of the line-card comprises initiating the deactivation to deactivate the line-card, wherein the line-card consumes at least 80% less power when deactivated as compared to when the line-card is activated.

23. The network switch of claim 18, wherein the deactivation process deactivates the line-card, and the line-card consumes at least 80% less power when deactivated as compared to when the line-card is activated.

* * * * *